United States Patent [19]

Schoellkopf et al.

[11] Patent Number: 4,922,409

[45] Date of Patent: May 1, 1990

[54] BUS CONTROL DEVICE COMPRISING A PLURALITY OF ISOLATABLE SEGMENTS

[75] Inventors: Jean-Pierre Schoellkopf, Grenoble; Yann Boyer-Chammard, Boulogne-Billancourt, both of France

[73] Assignee: Bull S.A., Paris, France

[21] Appl. No.: 111,260

[22] Filed: Oct. 22, 1987

[30] Foreign Application Priority Data

Oct. 23, 1986 [FR] France ................. 86 14717

[51] Int. Cl.$^5$ ............................................ G06F 13/40
[52] U.S. Cl. .................... 364/200; 364/240.5; 364/240.7; 307/112
[58] Field of Search ............... 307/112, 139, 141.4; 364/200 MS File, 900 MS File

[56] References Cited

U.S. PATENT DOCUMENTS

| 4,296,469 | 10/1981 | Gunter et al. | 364/200 |
| 4,302,642 | 11/1981 | Hruda et al. | 307/112 |
| 4,583,088 | 4/1986 | Bux et al. | 340/825.5 |
| 4,635,192 | 1/1987 | Ceccon et al. | 364/200 |
| 4,737,656 | 4/1988 | Grottlieb | 307/112 |
| 4,745,300 | 5/1988 | Kammerer et al. | 307/112 |

FOREIGN PATENT DOCUMENTS 7826276 9/1978 France .
1597333 9/1981 United Kingdom .

OTHER PUBLICATIONS

Patent Abstracts of Japan, vol. 7, No. 35 (p. 175) [1180], (listing Japanese Patent 57-187726, Matsushita Denki Sangkok.K, Nov. 18, 1982).

Primary Examiner—Gareth D. Shaw
Assistant Examiner—Debra A. Chun
Attorney, Agent, or Firm—Kerkam, Stowell, Kondracki & Clarke

[57] ABSTRACT

A bus control device for a central processing unit (CPU) comprising a plurality of isolatable segments, which permits the transfer of data from one segment to another two adjacent segments being connected with one another via switches (S01, S11, S02, S12) controlled by a selection signal (C12, C23), an amplification device (A1, A2, A3) controlled by an actuation signal (CA1, CA2, CA3) being associated with each bus segment for amplifying the voltages that appear on the lines (B01, B11, B02, B12, B03, B13) of this segment, said control device being characterized in that it includes slaving means (12, 13, 16, 22, 23, 26) for actuating the amplifier of any one segment is response to the actuation of the amplifier of a segment adjacent to the this segment and in reponse to the selection signal (C12, C23) for the switches that connect this segment to said adjacent segment.

21 Claims, 4 Drawing Sheets

BUS CONTROL DEVICE COMPRISING A PLURALITY OF ISOLATABLE SEGMENTS

BACKGROUND OF THE INVENTION

1. Field of the Invention

The invention relates to a device enabling control of the communication of a plurality of electrically isolatable bus segments. Since each segment is generally connected to output terminals of circuits capable of emitting or receiving digital data, putting two or more segments into communication then makes it possible to exchange data between the circuits of one of the segments and the circuits of other segments.

2. Description of the Prior Art

Buses capable of being subdivided into a plurality of segments comprise an important application, in particular in computer central processing units (CPUs). In order for a plurality of functional subsystems of the unit to operate simultaneously and independently, it is necessary to be able to isolate the circuits of these subsystems. On the other hand, it is also necessary to put two functional subsystems into communication with one another. Examples of subsystems include operators, registers or banks of registers. For solving the above problem, one solution is to provide means with which bus segments can be isolated at will, each segments being connected to the circuits that comprise one functional subsystem.

To realize buses comprising a plurality of isolatable segments, controlled switches are used, one switch connecting two homologous lines of two adjacent segments. These switches are controlled by selection signals emitted by the control unit of the computer. The logical state of the selection signals thus defines a certain bus configuration. A plurality of segments can be connected in series, while others can be isolated totally.

It is not difficult to realize such buses when the number of segments is relatively low. Contrarily, if the possibilities for parallelism are to be increased, it is desirable to have buses that can be subdivided into numerous independent segments. It is also necessary to be able to put two or more of any of the segments into communication, which could lead to a situation where the total bus capacity is very high. In that case, means are needed with which the voltages of the signals transmitted can be maintained at a sufficient level over the entire length of the bus. To do this, each bus segment is associated with amplification means, which are actuated each time the segment operates in the emission, transmission, or reception mode.

It is then also necessary to provide control means, in particular amplification devices, with which correct functioning of this system can be attained. In particular, the actuation of the amplifier associated with one segment must be delayed with respect to that of the adjacent segment by way of which the data arrives. If this constraint were to be neglected, there would be the risk of creating a state of instability that could lead to anarchic function of the amplifiers.

SUMMARY OF THE INVENTION

Thus, the invention proposes a device for controlling a bus of this kind, in which the actuation of the amplifier of any one segment is slaved to the actuation of the amplifier of the one of the adjacent segments that has already been actuated.

More precisely, the subject of the invention is a bus control device comprising a plurality of isolatable segments, which permits the transfer of data from one segment to another, two adjacent segments being connected with one another via switches controlled by a selection signal, an amplification device controlled by an actuation signal being associated with each bus segment for amplifying the voltages that appear on the lines of this segment, said control device being characterized in that it includes slaving means for actuating the amplifier of anyone segment is response to the actuation of the amplifier of a segment adjacent to the this segment and in response to the selection signal of the switches that connect this segment to said adjacent segment.

The functional subsystems connected to one bus segment maybe elements used only for reading, such as operators, for example, or elements capable of operating in the reading or writing mode, such as registers. Thus a bus comprising a plurality of segments must be capable of carrying data bidirectionally. Accordingly, the control device of the switches and amplifiers must permit this bidirectional function.

The control device is finally conceived to be able to be triggered upon the selection for the reading mode of any one segment of the bus.

The invention also proposes an an embodiment of the control device with which these constraints can be satisfied.

The invention further relates to a modular embodiment of the control device, in which each module is associated with one bus segment. More precisely, each module includes a pre-charged control line, the discharging of which actuates the amplifier of the associated bus segment; the discharging of this line can be controlled by the discharge of a control line associated with one of the adjacent segments.

In addition to its simplicity, this solution has the advantage that additional discharge means controlled by other signals can easily be connected to the control line, and a logical OR function can also be realized. In particular, this supplementary discharge means can be actuated in response to a reading control signal of one of the circuits connected to the segment associated with the line, thus making it possible to trigger the control function.

Finally, the invention proposes a very simple realization using CMOS technology.

BRIEF DESCRIPTION OF THE DRAWINGS

These details of embodiment, as well as further characteristics, will become apparent from the prefer redexemplary embodiment described in the ensuing description.

DESCRIPTION OF THE PREFERRED EMBODIMENTS

Figure 1:
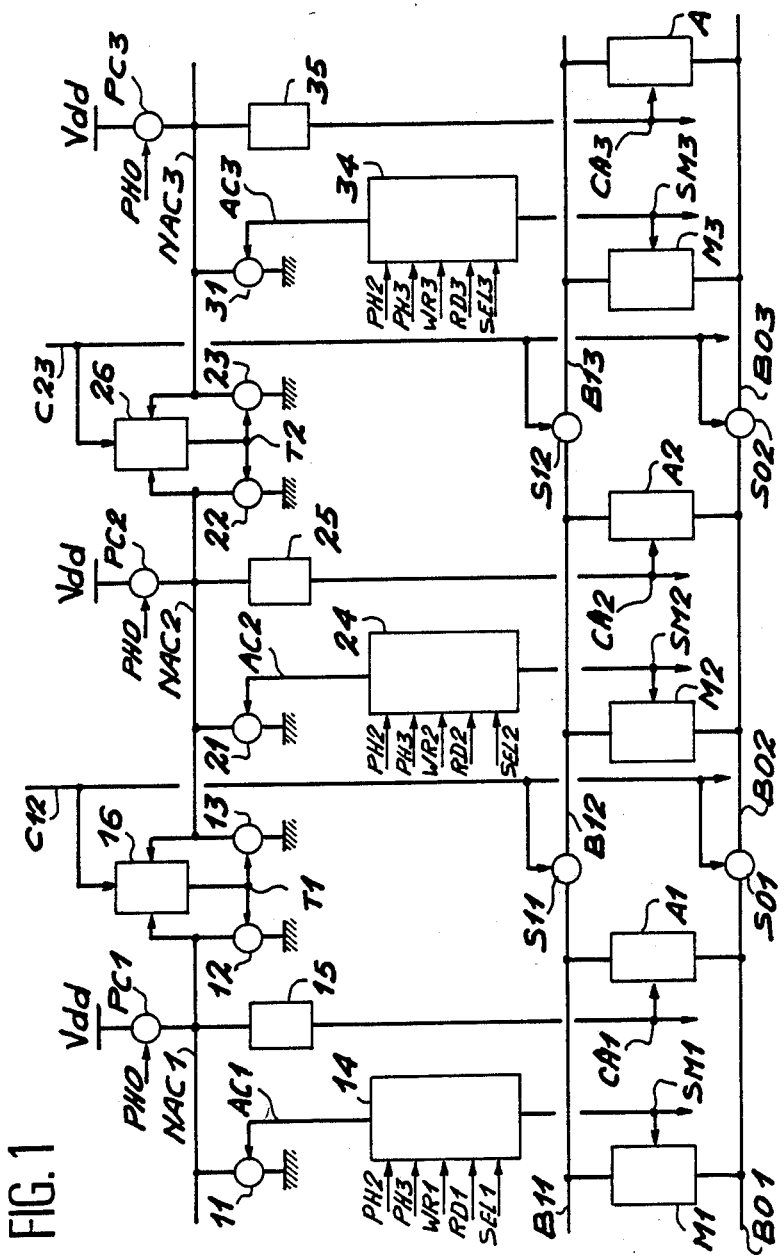
FIG. 1 schematically shows a control device according to the invention associated with three bus segments.

FIG. 1 shows three segments of one bus, only two bit lines of which have been shown, for the sake of clarity. The bit lines B01, B11 are part of the first segment; the bit lines B02, B12 are part of the second segment, and bit lines B03, B13 belong to the third segment. The bus portion that has been shown corresponds to a single digital data bit, which may include other bits associated with other bit lines, not shown. Each pair of bit lines, such as B01, B11, is connected to the output lines of one or more binary circuits, such Ml, capable of being one memory point, for example, or the output circuit associated with a single bit of an operator. Similarly, the binary circuits M2 and M3 are connected to a pair of bit lines of the second and third bus segments, respectively. Naturally a plurality of binary circuits may be connected to the same lines of the same segment. This would be the case, for example, for a register bank associated with the same segment. This binary circuit, such as M1, M2, M3, is put into communication with the corresponding bit lines by the action of a selection signal SM1, SM2, SM3 emitted by a selection and actuation circuit 14, 24, 34 in response to reselection and control signals SEL1-SEL3, RD1-RD3, WR1 -WR3, PH2, PH3.

Each pair of bit lines is connected to one amplification device A1, A2, A3 controlled by an actuation signal, CA1, CA2, CA3, respectively. These amplification devices may be standard reading amplifiers such as currently used in memory technology, for example.

Each bit line of one segment is connected to the homologous bit belonging to an adjacent segment, via the intermediary of a switch S01, S11, S02, S12. For one bus carrying the data of a plurality of bits, as switches will accordingly be provided as the bus has lines. All the switches located between two adjacent segments are controlled by the same selection signals C12, C23, which for a predetermined logical value puts these switches in the closed state.

The three bus segments are associated with control lines NAC1, NAC2, NAC3, respectively. Each of the control lines is connected to the input of an amplification circuit 15, 25, 35, the output of which furnishes the actuation signal CA1, CA2, CA3 of the corresponding amplifier. Because of this arrangement, the voltage present on one of the control lines determines the actuation of the amplifier of the segment associated with this line. With a view to CMOS technology, it is in fact the discharge of this line that brings about the actuation of the corresponding amplifier. Thus to trigger the amplification, it is sufficient to provide means for discharging the line that was initially pre-charged to a positive voltage.

For example, the line NAC2 associated with the second segment is connected to ground via a transistor switch 13. This switch is controlled by the output signal T1 of a transfer device 16 that at its input receives the selection signal C12 for the switches located between the first two segments. The transfer device is also connected at its input to two control lines NAC1 and NAC2, which are associated with the first two segments. The transfer device 16 is designed such that the signal T1 which it furnishes makes the switch 13 conductive when any one of the lines NAC1, NAC2 is discharged, on the condition that the selection signal C12 has the logical value that corresponds with the establishment of the conductive state of the switches that it controls.

On the other hand, the control line NAC1 of the first segment is also connected to a transistor switch 12, likewise controlled by the output signal T1 of the transfer device 16.

Analogously, the control line NAC3 associated with the third segment is connected to a transistor switch 23 controlled by another transfer device 26, which receives the signal selecting the switches located between the second and third segments. The output signal T2 of the transfer device 26 is applied to the control input of the switch 23. Similarly, the second control line is connected to another transistor switch 22 controlled by the signal T2.

The control lines NAC1, NAC2, NAC3 are also connected to a source of supply voltage Vdd via a switch PC1, PC2, PC3, respectively. Each of these switches is controlled by a clock signal PH0.

Finally, the three control lines NAC1, NAC2, NAC3 are connected to ground via supplementary transistor switches 11, 21, 31, which are controlled by the signals AC1, AC2, AC3, respectively, emitted by the circuits 14, 24, 34, respectively. These selection and actuation circuits 14, 24, 34 are designed such that they furnish a signal controlling the closure of the corresponding switch 11, 21, 31 when a reading control signal RD1, RD2, RD3 is present at their input. This arrangement makes it possible to trigger the function of the control device as soon as one segment has been selected for reading.

Although FIG. 1 shows only three bus segments, it will be appreciated that the embodiment described is applicable in general to any number of segments. To do this, the abovedescribed elements need merely be reproduced for each segment; that is, taking the second segment B02, B12 shown in FIG., 1 as an example, these elements are one control line NAC2, one means 22 for discharging this line, one transfer device 26 controlling this discharge means 22, one means 23 for discharging the adjacent line, the pre-charging means PC2, and optionally supplementary discharge means 21 provided in the event that the binary circuits connected to the segment are capable of being read. Thus the bus control means have a modular structure deriving from the structure of the bus itself. The control module may accordingly comprise a standard cell integrated with a CAD system (Computer-Aided Design). The function of the control device of FIG. 1 will now be described. By way of illustration, the particular case will be used of the transfer of a datum emitted by a circuit from the first segment to the third segment where this datum is to be memorized. The device functions in two phases, at least one of which corresponds to a pre-charging phase defined by a clock signal PH0. The purpose of this phase is to charge the control lines to a positive voltage Vdd. Moreover, in the example selected, the control signals for reading RD1 and selection SEL1 of the first segment are applied to the selection and actuation circuit 14. Similarly, the selection signals C12 and C23 for the switches are active. At the time of the reading phase, defined by a second clock signal PH2, the circuit 14 furnishes, firstly, the selection signal SM1 of one of the circuits of the first segment and secondly, the control signal AC1 of the switch 11 for discharging the control line NAC1 associated with this segment. As a result, the circuit M1 is put into communication with the bit lines B01, B11. Additionally, the control line NAC1 discharges via the switch 11. This discharge actuates the amplification circuit 15, which at its output furnishes an actuation signal CA1 for the amplification device A1. The discharge of the control line is also detected by the transfer device 16, validated by the selection signal C12. The transfer device then causes the actuation of the switch 13 of the adjacent line NAC2, causing the discharge of this line. Analogously, this discharge causes the actuation of the amplifier A2 of the second bus segment. Similarly, the transfer device 26 validated by the signal C23 causes the actuation of the switch 23 of the following control line NAC3, which causes the actuation of the amplifier A3 of the third segment.

According to this example, the datum emitted by the first segment must be written in one of the circuits M3 of the third segment, and so the writing control signal WR3 is applied to the actuation and selection circuit 34, as is the preselection signal SEL3 of the circuit M3. When the clock signal PH3 that defines the writing phase is active, the circuit 34 furnishes the selection signal SM3 to the circuit M3 that has been selected. This circuit M3 is then put into communication with the lines B03, B13, the voltages of which are at levels that enable writing, because of the action of the three amplifiers A1, A2, A3.

The function described above in a particular case can easily be applied more generally. In particular, the number of intermediate segments located between the first and last segment can be increased. It is likewise possible to control writing in a plurality of segments simultaneously. Finally, the device can function bidirectionally. It can also control the transfer of data on both sides of the segment controlled for reading.

Figure 2:
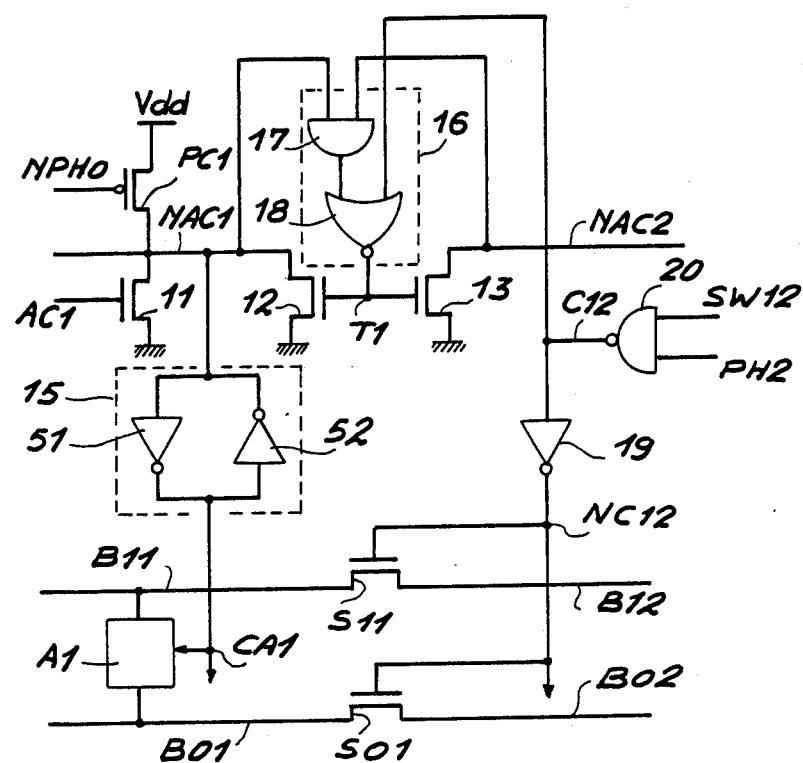
FIG. 2 represents an exemplary embodiment of a module that is part of the control device according to the invention.

FIG. 2 is a more detailed view of an embodiment of the circuits mentioned above with respect to FIG. 1. In this figure, the two bit lines B01, B11 of the first segment appear again, and the amplification device A1 is connected to them. This first segment is connected to an adjacent segment via NMOS transistors S01, S11. The drain-to-source path of each of these transistors is connected in series with the two homologous lines of the two adjacent segments. That is, the transistor S01 connects the line B01 of the first segment to the line B02 of the second segment. The transistor S11 likewise connects the line B11 to the line B12. This arrangement is reproduced as many times as there are data words containing bits.

The control line NAC1 is connected to the drain of a PMOS transistor PC1 (p-channel MOS transistors are represented in the drawing by a small circle located at their gate), the source of which is connected to the supply voltage Vdd. The gate of this transistor receives the complementary signal NPH0 of the clock signal PH0. This transistor PC1 comprises the means for precharging the control line. The control line NAC1 is also connected to the drain of an NMOS transistor 12, the source of which is connected to ground.

Similarly, the adjacent control line NAC2 is connected to the drain of another NMOS transistor 13, the source of which is connected to ground. The two transistors 12 and 13 comprise the discharging means for the lines NAC1 and NAC2, respectively. The gates of these transistors receive the output signal T1 of the transfer device 16. This device comprises an AND gate 17, the two inputs of which are connected respectively to the two control lines NAC1, NAC2. The output of this AND gate is connected to one input of a NOR gate 18, the output of which furnishes the signal T1. The second input of the gate 18 receives the signal C12 from the NAND gate 20. This gate receives at its input the clock signal PH2 which defines the reading phase and the signal SW12 controlling the connection in series of the first and second segments. The signal C12 is also applied to the input of a power inverter 19, the output of which is connected to the two gates of transistors, for instance S01, S11, connecting the two adjacent segments.

The control line NAC1 is connected to the input of an amplification circuit 15 which includes a power inverter 51, the output of which furnishes the actuation signal CA1 for the amplifier A1. The output of this inverter is also connected to the input of a second inverter 52, the output of which is connected to the input of the first inverter 51. These two inverters comprise a toggle, having the double function of amplifying the signal NAC1 and maintaining the voltage present on the control line NAC1.

The control line NAC1 is also connected to the drain of an NMOS transistor 11, the source of which is connected to ground. The gate of this transistor receives the signal AC1 emitted by the circuit 14. This latter transistor 11 comprises the second discharging means described in connection with FIG. 1.

The function of the circuit shown in FIG. 2 will now be described, using positive logic by convention. As before, the example taken is the case where data are to be transferred from the first segment to the adjacent segment on the right of the drawing. In this case, the signal SW12 assumes the value of logical 1, which corresponds to a preselection of the closure of the switches that connect the two adjacent segments.

During the pre-charging phase, the clock signal PH0 assumes the value of logical 1, and the complementary signal NPH0 assumes the value 0. As a result, the transistor PC1, of the p-type, is made conductive during this phase. The line NAC1 then charges to a positive voltage Vdd. It will be understood that all the bus control lines will charge in the same manner.

Figure 3:
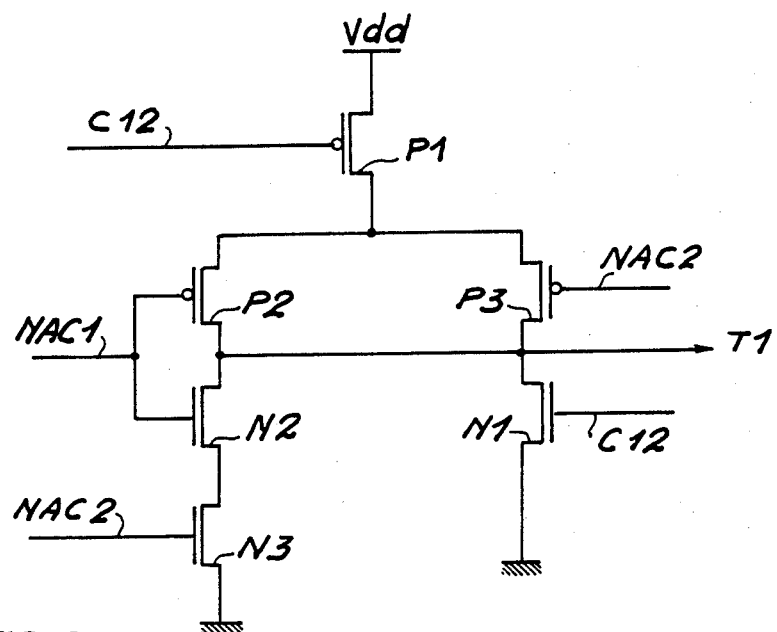
FIG. 3 represents a CMOS embodiment of a transfer device which is part of the device shown in FIG. 2.

At the time of the reading phase, the clock signal PH2 assumes the value of logical 1, and the output signal of the gate 20 assumes the value of logical 0, while the output voltage NC12 of the power inverter 19 becomes positive, making the transistors S01, S11 conductive. Since the first segment is controlled for reading, the signal AC1 will assume the value of logical 1 during this phase. The transistor 11 will then be conductive, thus discharging the line NAC1. The discharge of this line will have two consequences: first, the output of the power inverter 51 will assume the value of logical 1, thus actuating the amplifier A1 of the segment; second, the output of the AND gate 17 will assume the value of logical 0, and the output T1 of the NOR gate 18 will assume a positive voltage, making the transistor 13 that discharges the line NAC2 conductive. FIG. 3 shows an embodiment of the transfer device 16 using CMOS technology. A first transistor P1, of the PMOS type, the source of which is connected to the supply voltage Vdd, receives at its gate the selection signal C12 Its drain is connected to the source of the other two PMOS transistors P2, P3, the gates of which are connected respectively to the two control lines NAC1 and NAC2. The drains of the two transistors P2, P3 may be connected to one another, thus comprising the output T1 of the device. This point is then connected to the drain of a fourth transistor N1, of the NMOS type, the source of which is connected to ground and the gate of which receives the signal C12. This same common point is also connected to the drain of a fifth NMOS transistor, the gate of which receives the signal NAC1 and the source of which is connected to the drain of a sixth NMOS transistor N3, the gate of which receives the signal NAC2 and the source of which is connected to ground.

The function of this circuit is readily apparent and it will not be explained in detail here. It is easy to verify that the output voltage T1 assumes a positive value if any one of the signals NAC1 and NAC2 has a zero voltage and if the signal C12 also has a zero voltage.

Figure 4:
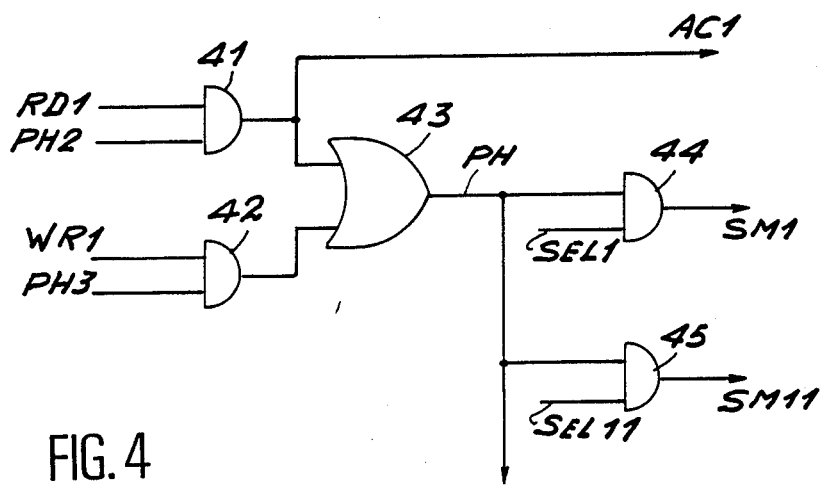
FIG. 4 shows an embodiment of a selection and actuation circuit that is part of the control device according to the invention.

FIG. 1 shows an embodiment of any one of the selection and actuation circuits 14, 24, 34 represented in FIG. 1. This circuit includes a first AND gate 41, the two inputs of which receive the reading control signal RD1 from the respective bus segment associated with this circuit. The other input of the AND gate 41 receives the clock signal PH2 defining the reading phase. The output of this AND gate 41 furnishes the signal AC1 which controls the discharge of the switch 11. A writing control signal WR and the clock signal PH3 that defines the writing phase are applied to the input of a second AND gate 42. The outputs of the two AND gates 41, 42 are connected to the input of an OR gate 43. The output PH of the OR gate 43 is applied to one input of a third AND gate 44 having two inputs, the second input of which receives the signal SEL1 for preselection of one of the circuits of the segment involved. The output of the AND gate 44 furnishes the signal SM1 for selecting this circuit. FIG. 4 also shows, by way of example, a fourth AND gate 45 having two inputs, which respectively receive the signals PH and SEL11 for preselection of a second circuit of the segment. The AND gate 45 furnishes the signal SM11 for selecting this circuit. Supplementary AND gates connected in the same manner may be provided in the event that the bus segment is to be connected to other separately selectable circuits, as is the case for a bank of registers.

The circuit of FIG. 4 functions in the following manner. In the case where reading or writing is controlled, one of the preselection signals SEL1, SEL11, ... assumes the value of logical 1. In the event of reading, the reading control signal RD1 has the value of logical 1, and the signal AC1 assumes this same value of logical 1 during the reading phase PH2. Similarly, the signal PH will have the value of logical 1, and one of the selection signals SM1, SM11, ... of the preselected circuit will assume this same value during the phase PH2. Contrarily, if writing is being performed, the signal WR1 will have the value of logical 1, and the output of the AND gate 42 will assume this same value 1 during the writing phase PH3. The result is that during this phase PH3 one of the selection signals SM1, SM11, ...of the preselected circuit will be set to 1 for the writing operation. The signal AC1 will maintain the value of logical 0.

It can be seen that this circuit does allow the actuation of the second means 11 for discharging the control line NAC1 associated with the bus segment on which one of these circuits has been selected for reading. Contrarily, at the time of reading in one of the circuits of this bus segment, the associated control line is not discharged by the action of the signal AC1. On the other hand, the effective selection of one of the circuits of the segment will take place during the reading phase PH2 if the reading control signal RD1 is active, and during the writing phase PH3 if the writing control signal WR1 is active.

Figure 5:
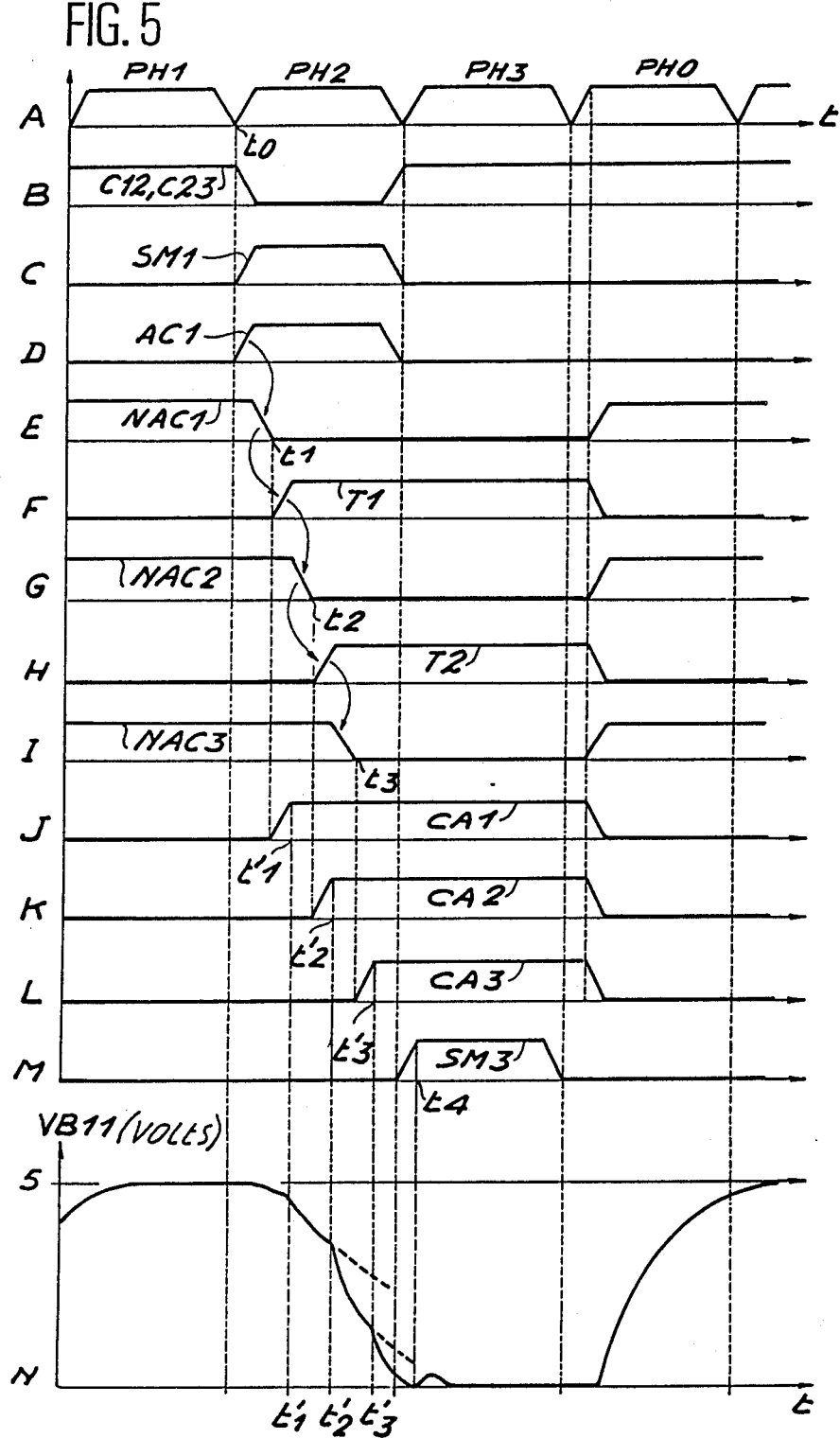
FIG. 5 provides time diagrams with which the function of the control device according to the invention is explained.

FIG. 5 shows time diagrams of the main signals involved in the control device according to the invention, in the particular case, mentioned above, where three bus segments are involved in performing the transfer of data between the first segment selected for reading and the third segment selected for writing. The time diagram A shows the signals that define the four clock phases PH0, PH1, PH2, PH3, which serve to sequence the central processing unit of a computer. Phase PH2 is dedicated to reading operations and phase PH3 is dedicated to writing operations, while phases PH0, PH1 define the phases of precharging and of equalizing the voltages of the bus lines.

The time diagram B shows the selection signals C12 and C23 applied to the switches that respectively connect the first segment to the second segment and the second segment to the third segment.

The time diagram C shows the signal SM1 for selecting one of the circuits of the first segment.

The time diagram D shows the signal AC1 that controls the switch 11 for discharging the line NAC1.

The time diagrams E, G and I respectively show the voltages present on the three control lines NAC1, NAC2 and NAC3. The time diagrams F and H respectively show the control signals T1 and T2 emitted by the transfer devices 16 and 26.

The time diagrams J, K and L respectively show the control signals CA1, CA2 and CA3 applied to the three amplifiers Al, A2, A3 of the three segments involved.

The time diagram M shows the selection signal SM3 applied to one of the circuits M3 of the third bus segment.

The time diagram N shows the variations as a function of time of the voltage present on one of the bit lines of the first segment. This time diagram corresponds to the case where the bit lines are normally pre-charged to a voltage of 5 volts, while the binary value that is read dictates that the voltage of this line will correspond to a zero voltage.

The reading phase PH2 begins at time t0, and at this instant the bit lines and the control lines are pre-charged to the supply voltage. During the phase PH2, the selection signals C12 and C23 are kept at the value of logical 0, while the signals SM1 and AC1 retain the value of logical 1. Setting the signal AC1 to 0 causes the discharge of the control line NAC1, which after a slight delay due to the time constant of this line shifts to the value of logical 0 at time t1. This causes the setting of the signal CA1 to logical 1 at time t'1. Similarly, the signal T1 appearing at the output of the transferred device 16 shifts to the value of logical 1, and this signal causes the discharging of the line NAC2 at time t2, after a delay due to the time constant of this line. The discharge of the line NAC2, in turn, causes the setting to logical 0 at time t'2 of the signal CA2 for controlling the amplifier of the second segment. This discharge also causes the setting to logical 1 of the signal T2 present at the output of the second transfer device 26. The signal T2 then causes the discharge of the control line NAC3, which then assumes the value of logical 0 at time t3. This discharge then causes the setting to 1 of the signal CA3, which then actuates the amplifier of this third segment.

The voltage shown in the time diagram N reflects the successive actuation of the three amplifiers Al, A2, A3 at times t'1, t'2, t'3, respectively.

During the writing phase PH3, the selection signal SM3 of one of the circuits of the third segment assumes the value of logical 1, thus permitting writing in this circuit during this phase.

At the time of the phase PH0, the pre-charging switches PC1, PC2, PC3 are closed, which cause the setting to logical 1 of all the bus control lines. As a result, the signals T1 and T2 are reset to 0, as are the amplifier control signals CA1, CA2, CA3. The corresponding amplifiers A1, A2, A3 are then deactuated, which then allows pre-charging of the bus lines.

The function of the control device described above by way of example shows that the actuation of the amplifiers is performed in succession by propagation of control signals, accompanying the propagation of the data carried by the various bus segments.

It can also be seen that only the amplifiers of the segments involved in the data transfer are active, to avoid useless consumption of the amplifiers associated with the segments not involved in this transfer.

Nevertheless, it should be noted that the capacity of the control lines must be sufficient to impose time constants that introduce a suitable delay between the actuation of the two successive amplifiers, to allow them sufficient amplification time. In the case of a realization by CMOS technology, the capacity of the control lines can easily be calculated and obtained by dimensioning the structural capacities of the MOS transistors used.

Finally, it should be noted that the delay between the actuation of the two adjacent amplifiers which is shown in the time diagrams of FIG. 5 is exaggerated as compared with reality, for the sake of clarity in the drawing. In fact, the time interval between two actuation is much shorter than the duration of the clock phase PH2. In practice, it will thus be possible to connect a great number of bus segments, while being certain that all the amplifiers will have been actuated during the period of time defined by the two phases PH2 and PH3.

We claim:

1. A control device comprising a plurality of isolatable bus segments, which permits the transfer of data from one bus segment to another, two adjacent bus segments being connected with one another via switches (S01, S11, S02, S12) controlled by a selection signal (C12, C23), an amplifier (A1, A2, A3) controlled by an actuation signal (CA1, CA2, CA3) being associated with one of said bus segments to which the amplifier is connected for amplifying voltages that appear on lines (B01, B11, B02, B12, B03, B13) of the last mentioned bus segment, said control device being characterized in that it includes slaving means (12, 13, 16, 22, 23, 26) for actuating the amplifier of any one bus segment in response to the actuation of the amplifier of a bus segment adjacent to said any one bus segment and in response to the selection signal (C12, C23) for the switches that connect said any one bus segment to said adjacent bus segment, at least one readable circuit connected with each segment, triggering means (14, 11, 24, 21, 34, 31) associated with at least one of the bus segments for actuating the amplifier (A1, A2, A3) associated with said last mentioned bus segment in response to a reading control signal (RD1, RD2, RD3) for the readable circuit or one of the readable circuits connected with said bus segment, and further characterized in that said slaving means include control lines (NAC1, NAC2, NAC3), each control line (NAC2) being assigned to one of the bus segments, the control device further including precharging means (PC2) connected to said control line (NAC2) for pre-charging said control line to a predetermined voltage during a pre-charging phase, said slaving means includes first means (13) for discharging said control line being controlled by a transfer device (16) associated with said one of the bus segments and an adjacent one of said bus segments and responsive to the voltage of the control line (NAC1) assigned to a bus segment adjacent to said one bus segment and to the selection signal (C12) of the switches connecting said segment with said adjacent segment, the discharge of a line (NAC1, NAC2, NAC3) causing the actuation of the amplifier (A1, A2, A3) of the associated segment.

2. A control device as defined by claim 1, characterized in that said first means for discharging a control line NAC2) includes at least one discharge transistor (13) of the n-channel field effect type, the source of which is connected to ground, the drain of which is connected to said control line (NAC2), and the gate of which receives an output signal (T1) of a transfer device (16).

3. A control device as defined by claim 2, characterized in that the transfer device (16) associated with two adjacent segments comprises an AND gate (17) having two inputs connected respectively to the two control lines (NAC1, NAC2) assigned to the two adjacent segments, the output of the AND gate (17) being connected to one input of a NOR gate (18) the other input of which receives a complementary signal (C12) assuming the value of logical 1 only when the selection signal (NC12) controls the closing of the switches that connect the two adjacent segments, the output (T1) of the NOR gate (18) being connected to the gates of two discharging transistors (12, 13) assigned respectively to the two control lines.

4. A control device as defined by claim 1, characterized in that the triggering means associated with one of the bus segments comprise an actuation circuit (14, 24, 34, 41) receiving the reading control signal (RD1, RD2, RD3) and having an output which (AC1, AC2, AC3) is applied to a control input of second discharging means (11, 21, 31) for discharging the control line (NAC1, NAC2, NAC3) assigned to said segment.

5. A control device as defined by claim 2, characterized in that the triggering means associated with one of the bus segments comprise an actuation circuit (14, 24, 34, 41) receiving the reading control signal (RD1, RD2, RD3) and having an output which (AC1, AC2, AC3) is applied to a control input of second discharging means (11, 21, 31) for discharging the control line (NAC1, NAC2, NAC3) assigned to said segment.

6. A control device as defined by claim 3, characterized in that the triggering means associated with one of the bus segments comprise an actuation circuit (14, 24, 34, 41) receiving the reading control signal (RD1, RD2, RD3) and having an output which (AC1, AC2, AC3) is applied to a control input of second discharging means (11, 21, 31) for discharging the control line (NAC1, NAC2, NAC3) assigned to said segment.

7. A control device as defined by claim 4, characterized in that the second discharging means comprise a discharging transistor (11, 21, 31) of the n-channel field effect type, the source of which is connected to ground, the drain of which is connected to the control line (NAC1, NAC2, NAC3) and the gate of which is connected to the output (AC1, AC2, AC3) of the actuation circuit (14, 24, 34, 41).

8. A control device as defined by claim 5, characterized in that the second discharging means comprise a discharging transistor (11, 21, 31) of the n-channel field effect type, the source of which is connected to ground, the drain of which is connected to the control line (NAC1, NAC2, NAC3) and the gate of which is connected to the output (AC1, AC2, AC3) of the actuation circuit (14, 24, 34, 41).

9. A control device as defined by claim 6, characterized in that the second discharging means comprise a discharging transistor (11, 21, 31) of the n-channel field effect type, the source of which is connected to ground, the drain of which is connected to the control line (NAC1, NAC2, NAC3) and the gate of which is connected to the output (AC1, AC2, AC3) of the actuation circuit (14, 24, 34, 41).

10. A control device as defined by claim 1, characterized in that said pre-charging means (PC1) comprise a pre-charging transistor of the p-channel field effect type, the source of which is connected to a source of positive supply voltage (Vdd), the drain of which is connected to the control line (NAC1, NAC2, NAC3) and the gate of which receives a signal (NPH0) making said pre-charging transistor conductive during the pre-charging phase.

11. A control device as defined by claim 2, characterized in that said pre-charging means (PC1) comprise a pre-charging transistor of the p-channel field effect type, the source of which is connected to a source of positive supply voltage (Vdd), the drain of which is connected to the control line (NAC1, NAC2, NAC3) and the gate of which receives a signal (NPH0) making said precharging transistor conductive during the pre-charging phase.

12. A control device as defined by claim 3, characterized in that said pre-charging means (PC1) comprise a pre-charging transistor of the p-channel field effect type, the source of which is connected to a source of positive supply voltage (Vdd), the drain of which is connected to the control line (NAC1, NAC2, NAC3) and the gate of which receives a signal (NPH0) making said precharging transistor conductive during the pre-charging phase.

13. A control device as defined by claim 4, characterized in that said pre-charging means (PC1) comprise a pre-charging transistor of the p-channel field effect type, the source of which is connected to a source of positive supply voltage (Vdd), the drain of which is connected to the control line (NAC1, NAC2, NAC3) and the gate of which receives a signal (NPH0) making said precharging transistor conductive during the pre-charging phase.

14. A control device as defined by claim 7, characterized in that said pre-charging means (PC1) comprise a pre-charging transistor of the p-channel field effect type, the source of which is connected to a source of positive supply voltage (VDD), the drain of which is connected to the control line (NAC1, NAC2, NAC3) and the gate of which receives a signal (NPH0) making said precharging transistor conductive during the pre-charging phase.

15. A control device as defined by claim 10, characterized in that the control line (NAC1, NAC2, NAC3) assigned to a bus segment is connected to the input of a power inverter (51), the output of which furnishes the actuation signal (CA1, CA2, CA3) for the amplifier (A1, A2, A3) of said segment, and further comprising a second inverter (52) having its input and its output connected respectively to the output and input of said power inverter (51).

16. A control device as defined by claim 11, characterized in that the control line (NAC1, NAC2, NAC3) assigned to a bus segment is connected to the input of a power inverter (51), the output of which furnishes the actuation signal (CA1, CA2, CA3) for the amplifier (A1, A2, A3) of said segment, and further comprising a second inverter (52) having its input and its output connected respectively to the output and input of said power inverter (51).

17. A control device as defined by claim 12, characterized in that the control line (NAC1, NAC2, NAC3) assigned to a bus segment is connected to the input of a power inverter (51), the output of which furnishes the actuation signal (CA1, CA2, CA3) for the amplifier (A1, A2, A3) of said segment, and further comprising a second inverter (52) having its input and its output connected respectively to the output and input of said power inverter (51).

18. A control device as defined by claim 13, characterized in that the control line (NAC1, NAC2, NAC3) assigned to a bus segment is connected to the input of a power inverter (51), the output of which furnishes the actuation signal (CA1, CA2, CA3) for the amplifier (A1, A2, A3) of said segment, and further comprising a second inverter (52) having its input and its output connected respectively to the output and input of said power inverter (51).

19. A control device as defined by claim 14, characterized in that the control line (NAC1, NAC2, NAC3) assigned to a bus segment is connected to the input of a power inverter (51), the output of which furnishes the actuation signal (CA1, CA2, CA3) for the amplifier (A1, A2, A3) of said segment, and further comprising a second inverter (52) having its input and its output connected respectively to the output and input of said power inverter (51).

20. A control device according to claim 1, characterized in that the switches (S01, S11, S02, S12) connecting two adjacent segments comprise as many n-channel field effect transistors as the bus has lines, the drain-source path of a transistor being connected in series with two lines of the adjacent segments, and the gates of said transistors receiving the selection signal (NC12).

21. A control device comprising:
a plurality of isolatable bus segments for transfer of data, each bus segment having a plurality of lines;
a plurality of switches connecting adjacent bus segments and controlled by selection signals;
a plurality of amplifiers, each amplifier connected to a an associated bus segment to amplify voltages that appear on lines of the associated bus segment and controlled by an activation signal corresponding to the associated bus segment;
a plurality of slaving means for actuating the amplifier of any one bus segment in response to the actuation of the amplifier of a bus segment adjacent to said any one bus segment and in response to the selection signal for the switches connecting said any one bus segment to said adjacent bus segment;
a plurality of readable circuits, there being at least one readable circuit connected to an associated one of said bus segments;
a plurality of triggering means, each triggering means associated with at least one of said bus segments for actuating the amplifier associated with the last-mentioned at least one of said bus segments in response to a reading control signal for the readable circuit or one of the readable circuits connected to the last-mentioned at least one of said bus segments; and wherein said slaving means includes control lines, each control line assigned to an associated one of said bus segments; and said control device further comprising:

a plurality of pre-charging means, each pre-charging means connected to an associated one of said control lines for pre-charging said associated one of said control lines to a predetermined voltage during a precharging phase; and each of said slaving means includes a transfer device and a first discharging means for discharging an associated one of said control lines assigned to a first one of said bus segments controlled by said transfer device responsive to a voltage on another of said control lines assigned to a second one of said bus segments adjacent said first bus segment and to the selection signal of the switches connecting said first and second bus segments; and wherein the discharge of one of said control lines actuates the amplifier of the associated bus segment.

* * * * *

UNITED STATES PATENT AND TRADEMARK OFFICE
CERTIFICATE OF CORRECTION

PATENT NO. : 4,922,409

DATED : May 1, 1990

INVENTOR(S) : Jean-Pierre Schoellkopf, et al

It is certified that error appears in the above-identified patent and that said Letters Patent is hereby corrected as shown below:

In the Abstract, line 4, after "another" insert a comma --,--.

Col. 10, line 13, claim 2, line 3, "line NAC2)" should be --line (NAC2)--.

Col. 11, claim 14, line 5, "(VDD)" should be --(Vdd)--.

Signed and Sealed this

Twenty-fifth Day of February, 1992

Attest:

HARRY F. MANBECK, JR.

Attesting Officer     Commissioner of Patents and Trademarks